United States Patent
Kato et al.

(10) Patent No.: US 11,110,439 B2
(45) Date of Patent: Sep. 7, 2021

(54) DELAFOSSITE-TYPE OXIDE FOR EXHAUST GAS PURIFICATION CATALYST, AND EXHAUST GAS PURIFICATION CATALYST USING SAME

(71) Applicants: AKITA UNIVERSITY, Akita (JP); Mitsui Mining & Smelting Co., Ltd., Tokyo (JP)

(72) Inventors: Sumio Kato, Akita (JP); Masataka Ogasawara, Akita (JP); Toshiharu Moriya, Saitama (JP); Katsuya Iwashina, Saitama (JP); Hironori Iwakura, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 16/473,335

(22) PCT Filed: Dec. 22, 2017

(86) PCT No.: PCT/JP2017/046120
§ 371 (c)(1),
(2) Date: Jun. 25, 2019

(87) PCT Pub. No.: WO2018/123863
PCT Pub. Date: Jul. 5, 2018

(65) Prior Publication Data
US 2020/0122129 A1    Apr. 23, 2020

(30) Foreign Application Priority Data

Dec. 27, 2016 (JP) .............................. JP2016-252337

(51) Int. Cl.
| | | |
|---|---|---|
| *B01J 23/89* | (2006.01) | |
| *F01N 3/10* | (2006.01) | |
| *F01N 3/28* | (2006.01) | |
| *B01D 53/94* | (2006.01) | |
| *B01J 37/03* | (2006.01) | |
| *B01J 37/08* | (2006.01) | |

(52) U.S. Cl.
CPC ........ *B01J 23/8926* (2013.01); *B01D 53/945* (2013.01); *B01J 37/031* (2013.01); *B01J 37/08* (2013.01); *F01N 3/101* (2013.01); *F01N 3/2803* (2013.01); *F01N 2370/02* (2013.01); *F01N 2510/06* (2013.01)

(58) Field of Classification Search
CPC ...... B01J 23/8926; F01N 3/101; F01N 3/2803
See application file for complete search history.

(56) References Cited

U.S. PATENT DOCUMENTS

| | | | |
|---|---|---|---|
| 6,720,100 B2* | 4/2004 | Sato ...................... | B01J 23/002 429/479 |
| 6,979,435 B1* | 12/2005 | Shahriari ................ | C01G 1/00 423/263 |
| 7,585,588 B2* | 9/2009 | Tanoue ................... | H01M 4/06 429/174 |
| 7,951,348 B2* | 5/2011 | Shahriari ................ | C01G 1/00 423/263 |
| 9,911,519 B2* | 3/2018 | Kim ..................... | H01L 31/0224 |
| 9,985,139 B2* | 5/2018 | Nomura ................. | H01L 29/04 |
| 2009/0078318 A1* | 3/2009 | Meyers ................. | H01L 31/073 136/260 |
| 2010/0105545 A1 | 4/2010 | Hayashi | |
| 2010/0282320 A1* | 11/2010 | Meyers ................. | H01L 31/073 136/260 |
| 2011/0281135 A1* | 11/2011 | Gong ................... | C23C 18/1653 428/626 |
| 2015/0352530 A1 | 12/2015 | Nagao et al. | |
| 2016/0068963 A1* | 3/2016 | Gong ................... | B01J 37/349 427/554 |
| 2016/0319097 A1* | 11/2016 | Comstock .............. | C09D 5/004 |

FOREIGN PATENT DOCUMENTS

| | | |
|---|---|---|
| JP | 2002-255548 A | 9/2002 |
| JP | 2008-156130 A | 7/2008 |
| JP | 2009-219971 A | 10/2009 |
| WO | 2014/103597 A1 | 7/2014 |

OTHER PUBLICATIONS

International Search Report (ISR) dated Mar. 13, 2018 filed in PCT/JP2017/046120.

(Continued)

*Primary Examiner* — Cam N. Nguyen
(74) *Attorney, Agent, or Firm* — Rankin, Hill & Clark LLP

(57) ABSTRACT

In relation to a Cu-based delafossite-type oxide that is effective as an exhaust gas purification catalyst, Cu is placed in a high catalytic activity low-valence state, whereby a novel Cu-based delafossite-type oxide having higher activity than in the past is provided. Proposed is a delafossite-type oxide for an exhaust gas purification catalyst that is represented by a general formula $ABO_2$, wherein Cu and Ag are contained in the A site of the general formula, one or two or more elements selected from the group consisting of Mn, Al, Cr, Ga, Fe, Co, Ni, In, La, Nd, Sm, Eu, Y, V, and Ti are contained in the B site of the general formula, and Ag is contained at a ratio of 0.001 at. % or more and less than 20 at. % in the A site of the general formula.

7 Claims, No Drawings

(56) References Cited

OTHER PUBLICATIONS

J. Christopher et al., "Catalytic activity and XPS investigation of dalofossite oxides, CuMO2 (M=Al, Cr or Fe)", Journal of Materials Science, 27, pp. 1353-1356, 1992.; Cited in Specification.
Okuda, T. et al., Dimensional Crossover of Low-Energy Magnetic Excitation for Delafossite Oxide Cu1—xAgxCrO2 with a Spin-3/2 Antiferromagnetic Triangular Sublattice, Journal of the Physical Society of Japan, Jan. 13, 2009, vol. 78, No. 1, 013604-1-013604-4.; Cited in ISR.

* cited by examiner

DELAFOSSITE-TYPE OXIDE FOR EXHAUST GAS PURIFICATION CATALYST, AND EXHAUST GAS PURIFICATION CATALYST USING SAME

TECHNICAL FIELD

The present invention relates to a delafossite-type oxide that is used for an exhaust gas purification catalyst for purifying an exhaust gas emitted from an internal-combustion engine, and an exhaust gas purification catalyst using the same.

BACKGROUND ART

Exhaust gases emitted from internal-combustion engines of automobiles or the like that use gasoline as a fuel include harmful components such as hydrocarbon (HC), carbon monoxide (CO), and nitrogen oxide (NOx). As such, it is necessary to purify each of the harmful components using an oxidation-reduction reaction before emission. For example, it is necessary to purify the exhaust gas such that the hydrocarbon (HC) is converted into water and carbon dioxide by oxidation, the carbon monoxide (CO) is converted into carbon dioxide by oxidation, and the nitrogen oxide (NOx) is converted into nitrogen by reduction.

As a catalyst for treating such an exhaust gas emitted from an internal-combustion engine (hereinafter, referred to as "exhaust gas purification catalyst"), a three-way catalyst (TWC) capable of oxidizing and reducing CO, HC, and NOx has been used.

As this type of three-way catalyst, a catalyst, in which precious metal is supported on a refractory oxide porous material such as an alumina porous material having a wide surface area, and then supported on a substrate such as a monolithic substrate made of a refractory ceramic or metallic honeycomb structure, or on refractory particles, is known.

The exhaust gas purification catalyst is required to always exert high purification performance even under the condition where an air-fuel ratio varies. Therefore, a promoter having oxygen storage/release capacity (OSC) (also referred to as "OSC material") is allowed to coexist with precious metal, thereby securing purification performance.

An oxide such as ceria is the OSC material having oxygen storage/release capacity by which trivalent and tetravalent of Ce ions in a crystal lattice are reversibly changed. The OSC material that is allowed to coexist with precious metal is able to reduce a change in the exhaust gas atmosphere and to greatly improve the purification rate.

In the conventional OSC materials, that is, the oxygen storage/release materials, there has been a problem that the materials cannot exhibit oxygen storage/release performance at lower temperature when precious metal, which is a rare resource, does not exist therein.

Therefore, as an oxygen storage/release material not requiring precious metal, a stacked mixed layer irregular crystal structure delafossite-type oxide having specific oxygen storage/release characteristics is proposed (see Patent Document 1).

However, the above oxide has oxygen storage/release capacity only at a relatively high temperature. Therefore, a delafossite-type oxide, which does not require precious metal, having high oxygen storage/release capacity in a range of low temperature region to high temperature region, and a method for producing the same are proposed in Patent Document 2. Patent Document 2 discloses a delafossite-type oxide that is a 3R type delafossite-type oxide represented by a general formula $ABO_X$ (wherein A represents at least one element selected from the group consisting of Cu, Ag, Pd, and Pt, and B represents at least one element selected from the group consisting of Al, Cr, Ga, Fe, Mn, Co, Rh, Ni, In, La, Nd, Sm, Eu, Y, and Ti); and a method for producing the same, in which raw material powders are mixed in a desired composition ratio, press molded, and calcined under an inert atmosphere.

In addition to the above, in regard to the delafossite-type oxide, $CuMO_2$ (M=Al, Cr, Fe) as a hexagonal system 2H delafossite-type oxide has been examined as an $N_2O$ decomposing catalyst (see Non-Patent Document 1).

CITATION LIST

Non-Patent Document

Non-Patent Document 1: J. of Material Science, 27, 1353 to 1356, 1992

Patent Document

Patent Document 1: Japanese Patent Application Laid-Open (JP-A) No. 2002-255548
Patent Document 2: JP-A No. 2008-156130

SUMMARY OF THE INVENTION

Problem to be Solved by the Invention

As mentioned previously, the Cu-based delafossite-type oxide has been examined as an OSC material as well as an $N_2O$ decomposing catalyst.

However, when the Cu-based delafossite-type oxide is used as a three-way catalyst, it has been found that the Cu-based delafossite-type oxide alone is not sufficient for catalyst performance.

Therefore, the present invention relates to a Cu-based delafossite-type oxide that is effective as an exhaust gas purification catalyst, and is to propose a novel Cu-based delafossite-type oxide having higher activity than in the past by placing Cu in a high catalytic activity low-valence state.

Means for Solving Problem

The present invention proposes a delafossite-type oxide for an exhaust gas purification catalyst, represented by a general formula $ABO_2$, wherein Cu and Ag are contained in the A site of the general formula, one or two or more elements selected from the group consisting of Mn, Al, Cr, Ga, Fe, Co, Ni, In, La, Nd, Sm, Eu, Y, V, and Ti are contained in the B site of the general formula, and Ag is contained at a ratio of 0.001 at. % or more and less than 20 at. % in the A site of the general formula.

Effect of the Invention

The Cu-based delafossite-type oxide containing Cu has a layered structure and is able to maintain a dispersion state of Cu serving as an active component in good condition. Moreover, the delafossite-type oxide proposed by the present invention is able to place Cu in a high catalytic activity low-valence state and to further enhance the activity, by containing Cu in the A site of the general formula and Ag at a ratio of 0.001 at. % or more and less than 20 at. % in the A site thereof.

BEST MODE(S) FOR CARRYING OUT THE INVENTION

Next, examples of the embodiments for carrying out the present invention will be described. However, the present invention is not limited to the embodiments described below.

<Present Delafossite-Type Oxide>

The delafossite-type oxide for an exhaust gas purification catalyst according to an example of the present embodiment (referred to as "present delafossite-type oxide") is a delafossite-type oxide represented by a general formula $ABO_2$, wherein Cu and Ag are contained in the A site of the general formula, and one or two or more elements selected from the group consisting of Mn, Al, Cr, Ga, Fe, Co, Ni, In, La, Nd, Sm, Eu, Y, V, and Ti are contained in the B site of the general formula.

Whether or not it is the delafossite-type oxide can be confirmed by identifying peaks through an X-ray diffraction analysis (XRD).

The present delafossite-type oxide may consist of either a single phase of the delafossite or a mixed phase including a by-product phase of another element in addition to the main phase of the delafossite.

The present delafossite-type oxide contains Cu and Ag in the A site. By containing Cu serving as an active component in the A site, catalytic activity can be provided to the delafossite-type oxide. Moreover, in the delafossite-type oxide having a layered structure, a dispersion state of Cu can be maintained in good condition. In addition, by containing a predetermined ratio of Ag in the A site, Cu can be placed in a high catalytic activity low-valence state, so that a three-way catalyst can exhibit excellent performance on $NO_X$ purification which has been heretofore difficult to achieve. Here, whether or not it is a low-valence state can be confirmed, for example, by a Hydrogen TPR measurement or an X-ray photoelectron spectroscopy (XPS).

Originally, Ag and Cu are incompatible and difficult to be dispersed with each other. However, in the A site of the delafossite-type oxide having a layered structure, Cu and Ag are in a state of being uniformly dispersed, and it can be presumed that the reduction temperature of Cu can be lowered due to the effect of acting of Ag against Cu.

The content of Cu in the A site is preferably 80 at. % or more relative to the total content of elements constituting the A site.

When the content of Cu in the A site is 80 at. % or more, the catalyst can be used as a three-way catalyst having excellent $NO_X$ purification performance in particular. In addition, when the A site contains Cu alone, there is a possibility that Cu can be placed in a low catalytic activity high-valence state.

From such a viewpoint, the content of Cu in the A site is preferably 80 at. % or more relative to the total content of elements constituting the A site. Among others, it is more preferably 90 at. % or more or less than 99.999 at. %, even more preferably 95 at. % or more or 99.9 at. % or less, still more preferably 95 at. % or more or 99 at. % or less.

The content of Ag in the A site is preferably 0.001 at. % or more and less than 20 at. %.

When the content of Ag is 0.001 at. % or more, Cu is placed in a high catalytic activity low-valence state, so that the CO—NO reactivity can be improved and the purification performance of CO and NO can be enhanced. In addition, when the content of Ag is less than 20 at. %, the layered structure of the delafossite-type oxide can be easily maintained.

From such a viewpoint, the content of Ag in the A site is preferably 0.001 at. % or more and less than 20 at. %. Among others, it is more preferably 0.001 at. % or more or 10 at. % or less, even more preferably 0.1 at. % or more or 5 at. % or less, still more preferably 0.5 at. % or more or 3 at. % or less, furthermore preferably 1 at. % or more or 2 at. % or less.

Elements other than Cu and Ag may be contained in the A site as long as the contents of Cu and Ag are within the above range. Here, examples of the elements other than Cu and Ag may include one or two or more elements selected from Pd and Pt.

The B site in the present delafossite-type oxide may be composed of one or two or more elements selected from the group consisting of Mn, Al, Cr, Ga, Fe, Co, Ni, In, La, Nd, Sm, Eu, Y, V and Ti such that the formal valence in the B site is trivalent.

Among others, it is preferable when the B site is composed of one or two or more elements selected from the group consisting of Mn, Al, Cr, and Ga, since Cu in the A site becomes a stable monovalent state and hardly becomes a bivalent state where the catalytic activity is lower.

Further, it is preferable when either Mn alone or Mn and one or two or more elements selected from the group consisting of Al, Cr, and Ga are contained in the B site. By containing Mn in the B site in this way, the catalytic activity can be further enhanced. It can be presumed that this result is provided by the effect of a crystal structure distortion, that is, the Jahn-Teller effect.

Here, the atomic ratio of the content of Mn relative to the total content of Al, Cr, and Ga (Al+Cr+Ga) in the B site is preferably Mn:Al+Cr+Ga=10:90 to 90:10, more preferably 30:70 to 90:10, even more preferably 40:60 to 90:10. Especially, from the viewpoint of improving stable purification performance of HC and NO, the atomic ratio is preferably 50:50 to 90:10, more preferably 50:50 to 80:20. Here, the stable purification performance is indicated, for example, by the exhaust gas purification rate (η400) (%) at a temperature of 400° C.

(Average Particle Diameter)

The average particle diameter (D50) of the present delafossite-type oxide is preferably 0.1 to 60 μm.

It is preferable that the average particle diameter (D50) of the present delafossite-type oxide is 0.1 μm or more, since the heat resistance can be maintained while maintaining the peeling strength of a substrate and a catalyst layer that will later be described. Also, it is preferable that the average particle diameter (D50) of the present delafossite-type oxide is 60 μm or less, since the gas contactability can be improved while maintaining the peeling strength.

From such a viewpoint, the average particle diameter (D50) of the present delafossite-type oxide is preferably 0.1 to 60 μm, more preferably 4 μm or more or 50 μm or less.

Here, the average particle diameter (D50) is the D50 provided by a volume-standard particle size distribution obtained by measuring with a laser diffraction scattering-type particle size distribution measuring method. The same applies to the following D50.

(Synthesis of Present Delafossite-Type Oxide)

In order to obtain the present delafossite-type oxide, either a liquid-phase reaction method or a solid-phase reaction method can be employed.

However, it is preferable to employ the liquid-phase reaction method since the synthesis can be performed by calcining at lower temperature than that of the solid-phase reaction method, the atomization can be uniformly performed, and the specific surface area can be widened.

For example, in a coprecipitation method that is one of the liquid-phase reaction methods, nitrate, sulfate, or acetate is used as a starting raw material and weighed in a desired composition. A sodium hydroxide aqueous solution or the like is used as a precipitation material and dropped into the solution of the starting raw material such as nitrate, sulfate, or acetate, to thereby coprecipitate a precipitate. Then, it is preferable that the resultant precipitate is filtered, washed and dried, and then calcined at a temperature of 800 to 1,200° C. for 1 to 48 hours in a nitrogen or an air atmosphere. However, the method is not limited to this method.

<Present Catalyst>

The exhaust gas purification catalyst according to an example of the present embodiment (referred to as "present catalyst") is preferably an exhaust gas purification catalyst composition that contains the present delafossite-type oxide and an inorganic porous material.

In the present catalyst, it is preferable when the present delafossite-type oxide and an inorganic porous material are respectively present in a state of being mixed.

By containing the present delafossite-type oxide and an inorganic porous material, the catalytic active sites can be increased and the exhaust gas purification performance can be enhanced compared to that using the present delafossite-type oxide alone.

The present catalyst may contain other materials if necessary as long as the present delafossite-type oxide and an inorganic porous material are contained. Examples thereof may include an OSC material, a stabilizer, a binder, precious metals, and other additive components.

In the present catalyst, the content (mass) ratio of the present delafossite-type oxide to the inorganic porous material is preferably 10:90 to 70:30.

The ratio of the content (mass) of the present delafossite-type oxide to the total content (mass) of the present delafossite-type oxide and the inorganic porous material is preferably 10% or more since Cu serving as an active site can be sufficiently present in the catalyst. Furthermore, the ratio is preferably 70% or less since the contact probability with the exhaust gas can be maintained in a high condition.

From such a viewpoint, the content (mass) ratio of the delafossite-type oxide to the inorganic porous material is preferably 10:90 to 70:30, more preferably 15:85 to 70:30, even more preferably 15:85 to 60:40, still more preferably 20:80 to 50:50. Furthermore, it is especially preferable that the content of the inorganic porous material is more than that of the delafossite-type oxide.

In the present catalyst, the ratio of the average particle diameter (D50) of the present delafossite-type oxide to the average particle diameter (D50) of the inorganic porous materials is preferably 10:90 to 85:15, more preferably 10:90 to 75:25, even more preferably 15:85 to 60:40, still more preferably 15:85 to 50:50.

The ratio of the average particle diameter (D50) of the delafossite-type oxide to the average particle diameter (D50) of the inorganic porous materials is preferably in the aforementioned range, since the delafossite-type oxide and the inorganic porous material are not supported with each other but are respectively present in a state of being mixed, and the contact probability with the exhaust gas can be maintained in a high condition. Especially, from the viewpoint of gas diffusibility, it is more preferable that the average particle diameter (D50) of the delafossite-type oxide is smaller than the average particle diameter (D50) of the inorganic porous material, since the delafossite-type oxide is distributed in a highly dispersed state in the inorganic porous material.

<Present Inorganic Porous Material>

The inorganic porous material in the present catalyst (referred to "present inorganic porous material") is not for supporting the present delafossite-type oxide but for increasing the effective catalytic active sites in the present catalyst.

Examples of the present inorganic porous material may include porous particles of a compound selected from the group consisting of silicon, zirconium, aluminum, and titanium. More specific examples thereof may include porous particles composed of a compound selected from alumina, silica, silica-alumina, alumino-silicates, alumina-zirconia, alumina-chromia, alumina-ceria, and silica-zirconia-alumina. In addition, materials listed as OSC materials, which will later be described, can be also used as the inorganic porous material.

Examples of the alumina may include $\gamma$, $\delta$, $\theta$, and $\alpha$ alumina. Among others, $\gamma$, $\delta$, or $\theta$ alumina is preferably used. A very small amount of La may be contained in the alumina in order to enhance the heat resistance.

It is also preferable when the alumina is modified with an alkaline earth metal oxide, a silicon dioxide, a zirconium dioxide, an oxide of rare earth groups, or an oxide of transition metal such as Cr, Mn, Fe, Co, Ni, Cu, or Ag.

The present inorganic porous material may contain either two or more inorganic porous materials having different particle sizes, or two or more inorganic porous materials composed of different materials.

(Average Particle Diameter)

The average particle diameter (D50) of the present inorganic porous material is preferably 1 to 60 μm.

The average particle diameter (D50) of the present inorganic porous material is preferably 1 μm or more, since the peeling strength can be maintained. Also, the average particle diameter (D50) of the present inorganic porous material is preferably 60 μm or less, since the delafossite-type oxide can be distributed in a highly dispersed state while maintaining the peeling strength.

From such a viewpoint, the average particle diameter (D50) of the present inorganic porous material is preferably 1 to 60 μm, more preferably more than 7 μm or 45 μm or less, even more preferably 10 μm or more or 40 μm or less.

(Specific Surface Area)

The specific surface area of the present inorganic porous material is preferably 70 to 150 $m^2/g$.

The specific surface area of the present inorganic porous material is preferably 70 $m^2/g$ or more, since the delafossite-type oxide can be distributed in a highly dispersed state. Also, the specific surface area thereof is preferably 150 $m^2/g$ or less, since the heat resistance can be maintained.

From such a viewpoint, the specific surface area of the present inorganic porous material is preferably 70 to 150 $m^2/g$, more preferably 75 $m^2/g$ or more or 140 $m^2/g$ or less, even more preferably 80 $m^2/g$ or more or 130 $m^2/g$ or less.

<Other Contained Materials>

As mentioned previously, the present catalyst may contain other materials if necessary as long as the present delafossite-type oxide and the present inorganic porous material are contained. Examples thereof may include an OSC material, a binder, a stabilizer, precious metal, and other additive components.

(OSC Material)

Examples of the OSC material, that is, a promoter having oxygen storage/release capacity may include a cerium oxide, a zirconium oxide, a cerium-zirconium composite oxide, and the like.

(Binder)

As a binder, an inorganic binder, for example, an aqueous solution such as an alumina sol, a silica sol, and a zirconia sol may be used. These can be converted into the form of an inorganic oxide when calcined.

(Stabilizer)

Examples of the stabilizer may include an alkaline earth metal and an alkali metal. Among others, one or two or more metals can be selected from the group consisting of magnesium, barium, calcium, and strontium, and preferably selected from the group consisting of strontium and barium.

(Precious Metal)

The present catalyst is useful as an exhaust gas purification catalyst, especially as a three-way catalyst for internal combustion engines of automobiles or the like that use gasoline as a fuel even without containing precious metal. However, precious metal may be contained.

In this case, examples of the precious metal may include palladium (Pd), platinum (Pt), and rhodium (Rh), and these may be used alone or in combination of two or more kinds thereof.

<Method for Producing Present Catalyst>

The form of the present catalyst may be powdery, aggregated, or a layered structure, that is, a state of a catalyst layer where the catalyst is formed on a substrate.

Hereinafter, the producing method of the present catalyst supported as a catalyst layer on a substrate will be described.

First, a slurry-like catalyst composition can be obtained by mixing and stirring a powder composed of the present delafossite-type oxide, a powder composed of the present inorganic porous material, water, and optionally other materials such as an OSC material, a binder, and a stabilizer, and the catalyst composition can be supported on a substrate to produce the present catalyst.

Specifically, the catalyst layer can be formed as follows: for example, a powder composed of the present delafossite-type oxide, a powder composed of the present inorganic porous material, water, and optionally other materials such as an OSC material, a binder, and a stabilizer are mixed by a ball milling or the like to produce a slurry; and the slurry is coated on a substrate, and then dried and calcined.

Also, the catalyst layer can be formed on the substrate surface as follows: a powder composed of the present delafossite-type oxide, a powder composed of the present inorganic porous material, water, and optionally other materials such as an OSC material, a binder, and a stabilizer are mixed by a ball milling or the like to produce a slurry; and a substrate is immersed into the slurry, and pulled up and calcined.

However, the method for producing the present catalyst may employ any known method, and is not limited to the aforementioned examples.

(Substrate)

Examples of the material of the substrate may include a refractory material such as ceramics and a metal material.

Examples of the substrate material made of ceramics may include a refractory ceramic material such as cordierite, cordierite-alpha alumina, silicon nitride, zircon mullite, spodumene, alumina-silica magnesia, zircon silicate, sillimanite, magnesium silicate, zircon, petalite, alpha alumina, or alumino-silicates.

Examples of the substrate material made of metal may include a refractory metal such as other suitable corrosion resistant alloys based on stainless steel or iron.

Example of the shape of the substrate may include a honeycomb shape, a filter shape, a pellet shape, and a spherical shape.

In the case of using a honeycomb-shaped substrate, for example, a monolithic substrate having numerous fine gas flow passages, that is, channels parallel to each other inside the substrate may be used in order for the gas to flow through the inside of the substrate. Then, the catalyst layer can be formed by coating a catalyst composition on the inner wall surface of each channel of the monolithic substrate by wash coating or the like.

(Catalyst Layer)

The catalyst layer may be a single layer or a multilayer of two or more laminated on the substrate, and different catalyst layers may be formed on the upstream side and downstream side when the exhaust gas flows through.

Explanation of Terms

The expression "X to Y" (X and Y are arbitrary numbers) in the present specification also includes the intention of "preferably more than X" or "preferably less than Y" as well as the intention of "X or more and Y or less" unless otherwise stated.

In addition, the expression "X or more" (X is an arbitrary number) or "Y or less" (Y is an arbitrary number) also includes the intention of "preferably more than X" or "preferably less than Y".

EXAMPLES

Hereinafter, the present invention will be described based on the following Examples. However, the present invention is not limited to the following Examples.

Example 1

Copper nitrate trihydrate corresponding to 54.2 parts by mass in terms of Cu metal, silver nitrate corresponding to 0.9 parts by mass in terms of Ag metal, and chromium nitrate nonahydrate corresponding to 44.8 parts by mass in terms of Cr metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 12 hours in an air atmosphere to thereby obtain a CuAg-based delafossite-type oxide powder ($Cu_{0.99}Ag_{0.01}CrO_2$).

Next, a θ alumina ($Al_2O_3$) particle powder (D50: 12.4 μm, BET specific surface area: 105 m$^2$/g) was prepared, and 11.1 parts by mass of the CuAg-based delafossite-type oxide powder, 80.4 parts by mass of the θ alumina ($Al_2O_3$) particle powder, 8.5 parts by mass of a zirconia binder, and water were mixed and stirred for 2 hours using a propeller such that the content of Cu was 5.2% by mass relative to the total amount of the resultant CuAg-based delafossite-type oxide and the θ alumina ($Al_2O_3$) particle powder, thereby producing a slurry.

Next, a honeycomb substrate made of stainless steel (size: φ40×60 mm) was immersed in the slurry and pulled out therefrom, and then the excess slurry was blown off. Thereafter, the substrate was dried at 90° C. for 10 minutes and calcined at 500° C. for 1.5 hours to form a catalyst layer, thereby obtaining an exhaust gas purification catalyst (sample).

Example 2

Copper nitrate trihydrate corresponding to 52.9 parts by mass in terms of Cu metal, silver nitrate corresponding to 0.9 parts by mass in terms of Ag metal, and manganese nitrate corresponding to 46.2 parts by mass in terms of Mn metal were added to pure water and sufficiently stirred to obtain 1 mol/L of a transparent nitrate solution. 1 mol/L of a sodium hydroxide (NaOH) solution was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 850° C. for 12 hours in a nitrogen atmosphere to thereby obtain a CuAg-based delafossite-type oxide powder ($Cu_{0.99}Ag_{0.001}MnO_2$).

An exhaust gas purification catalyst (sample) was obtained in the same manner as in Example 1 by using the CuAg-based delafossite-type oxide powder thus obtained.

Example 3

Copper nitrate trihydrate corresponding to 53.5 parts by mass in terms of Cu metal, silver nitrate corresponding to 1.9 parts by mass in terms of Ag metal, and chromium nitrate nonahydrate corresponding to 44.7 parts by mass in terms of Cr metal were added to pure water and sufficiently stirred to obtain 1 mol/L of a transparent nitrate solution. 1 mol/L of a sodium hydroxide (NaOH) solution was dropped in the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 12 hours in an air atmosphere to thereby obtain a CuAg-based delafossite-type oxide powder ($Cu_{0.98}Ag_{0.02}CrO_2$).

An exhaust gas purification catalyst (sample) was obtained in the same manner as in Example 1 by using the CuAg-based delafossite-type oxide powder thus obtained.

Example 4

Copper nitrate trihydrate corresponding to 50.5 parts by mass in terms of Cu metal, silver nitrate corresponding to 5.5 parts by mass in terms of Ag metal, and chromium nitrate nonahydrate corresponding to 44.0 parts by mass in terms of Cr metal were added to pure water and sufficiently stirred to obtain 1 mol/L of a transparent nitrate solution. 1 mol/L of a sodium hydroxide (NaOH) was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 12 hours in an air atmosphere to thereby obtain a CuAg-based delafossite-type oxide powder ($Cu_{0.94}Ag_{0.06}CrO_2$).

An exhaust gas purification catalyst (sample) was obtained in the same manner as in Example 1 by using the CuAg-based delafossite-type oxide powder thus obtained.

Example 5

Copper nitrate trihydrate corresponding to 47.7 parts by mass in terms of Cu metal, silver nitrate corresponding to 9 parts by mass in terms of Ag metal, and of chromium nitrate nonahydrate corresponding to 41.8 parts by mass in terms of Cr metal were added to pure water and sufficiently stirred to obtain 1 mol/L of a transparent nitrate solution. 1 mol/L of a sodium hydroxide (NaOH) was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 12 hours in an air atmosphere to thereby obtain a CuAg-based delafossite-type oxide powder ($Cu_{0.9}Ag_{0.1}CrO_2$).

An exhaust gas purification catalyst (sample) was obtained in the same manner as in Example 1 by using the CuAg-based delafossite-type oxide powder thus obtained.

Example 6

Copper nitrate trihydrate corresponding to 65.2 parts by mass in terms of Cu metal, silver nitrate corresponding to 1.1 parts by mass in terms of Ag metal, aluminum nitrate nonahydrate corresponding to 22.4 parts by mass in terms of Al metal, and manganese nitrate hexahydrate corresponding to 11.4 parts by mass in terms of Mn metal were added to pure water and sufficiently stirred to obtain 1 mol/L of a transparent nitrate solution. 1 mol/L of a sodium hydroxide (NaOH) was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 850° C. for 12 hours in a nitrogen atmosphere to thereby obtain a CuAg-based delafossite-type oxide powder ($Cu_{0.09}Ag_{0.01}Mn_{0.2}O_2$).

An exhaust gas purification catalyst (sample) was obtained in the same manner as in Example 1 by using the CuAg-based delafossite-type oxide powder thus obtained.

Example 7

Copper nitrate trihydrate corresponding to 54.0 parts by mass in terms of Cu metal, silver nitrate corresponding to 0.9 parts by mass in terms of Ag metal, chromium nitrate nonahydrate corresponding to 35.7 parts by mass in terms of Cr metal, and manganese nitrate hexahydrate corresponding to 9.4 parts by mass in terms of Mn metal were added to pure water and sufficiently stirred to obtain 1 mol/L of a transparent nitrate solution. 1 mol/L of a sodium hydroxide (NaOH) was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 12 hours in a nitrogen atmosphere to thereby obtain a CuAg-based delafossite-type oxide powder ($Cu_{0.99}Ag_{0.01}Cr_{0.8}Mn_{0.2}O_2$).

An exhaust gas purification catalyst (sample) was obtained in the same manner as in Example 1 by using the CuAg-based delafossite-type oxide powder thus obtained.

Example 8

Copper nitrate trihydrate corresponding to 53.6 parts by mass in terms of Cu metal, silver nitrate corresponding to 0.9 parts by mass in terms of Ag metal, chromium nitrate nonahydrate corresponding to 22.1 parts by mass in terms of Cr metal, and manganese nitrate hexahydrate corresponding to 23.4 parts by mass in terms of Mn metal were added to pure water and sufficiently stirred to obtain 1 mol/L of a transparent nitrate solution. 1 mol/L of a sodium hydroxide (NaOH) was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 12 hours in a nitrogen atmosphere to thereby obtain a CuAg-based delafossite-type oxide powder ($Cu_{0.99}Ag_{0.01}Cr_{0.5}Mn_{0.5}O_2$).

An exhaust gas purification catalyst (sample) was obtained in the same manner as in Example 1 by using the CuAg-based delafossite-type oxide powder thus obtained.

Example 9

Copper nitrate trihydrate corresponding to 53.2 parts by mass in terms of Cu metal, silver nitrate corresponding to 0.9 parts by mass in terms of Ag metal, chromium nitrate nonahydrate corresponding to 8.8 parts by mass in terms of Cr metal, and manganese nitrate hexahydrate corresponding to 37.1 parts by mass in terms of Mn metal were added to pure water and sufficiently stirred to obtain 1 mol/L of a transparent nitrate solution. 1 mol/L of a sodium hydroxide (NaOH) was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 12 hours in a nitrogen atmosphere to thereby obtain a CuAg-based delafossite-type oxide powder ($Cu_{0.99}Ag_{0.01}Cr_{0.2}Mn_{0.8}O_2$).

An exhaust gas purification catalyst (sample) was obtained in the same manner as in Example 1 by using the CuAg-based delafossite-type oxide powder thus obtained.

Using an X-ray diffractometer (Mini Flex 600, target: Cu, accelerating voltage: 40 kV, manufactured by Rigaku Corporation), the peak pattern of the AgCu-based delafossite-type oxide powder used in each of Examples 1 to 9 was measured, and as a result, it was confirmed that a crystal structure of a 3R-type delafossite-type oxide was obtained.

Furthermore, the exhaust gas purification catalyst (sample) obtained in each of Examples 1 to 9 was observed by an electron microscope, and as a result, it was confirmed that the delafossite-type oxide particles and the inorganic porous particles were not supported with each other but were respectively present in a state of being mixed.

Comparative Example 1

Copper nitrate trihydrate corresponding to 55.0 parts by mass in terms of Cu metal and chromium nitrate nonahydrate corresponding to 45.0 parts by mass in terms of Cr metal were added to pure water and sufficiently stirred to obtain 1 mol/L of a transparent nitrate solution. 1 mol/L of a sodium hydroxide (NaOH) was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 12 hours in a nitrogen atmosphere to thereby obtain a CuCr oxide powder ($CuCrO_2$).

An exhaust gas purification catalyst (sample) was obtained in the same manner as in Example 1 by using the CuCr oxide powder thus obtained.

Comparative Example 2

Copper nitrate trihydrate corresponding to 40.9 parts by mass in terms of Cu metal, silver nitrate corresponding to 17.3 parts by mass in terms of Ag metal, and chromium nitrate nonahydrate corresponding to 35.7 parts by mass in terms of Cr metal were added to pure water and sufficiently stirred to obtain 1 mol/L of a transparent nitrate solution. 1 mol/L of a sodium hydroxide (NaOH) was dropped into the transparent nitrate solution to obtain a precipitate.

The resultant precipitate was aged at room temperature for 24 hours, and then sufficiently washed with water, filtered, and dried at 120° C. to obtain a precursor. The precursor was then calcined at 900° C. for 12 hours in an air atmosphere to thereby obtain a CuAg-based oxide powder ($Cu_{0.8}Ag_{0.2}CrO_2$).

An exhaust gas purification catalyst (sample) was obtained in the same manner as in Example 1 by using the CuAg-based oxide powder thus obtained.

<Measurement of Contents of Cu and Ag>

With regard to the exhaust gas purification catalyst (sample) obtained in each of Examples and Comparative Examples, the contents of Cu and Ag were respectively measured by a calibration curve method using an X-ray fluorescence spectrometer (ZSX Primus II, manufactured by Rigaku Corporation).

Each of the obtained contents of Cu and Ag was shown in Tables 1 and 2 as a mass ratio relative to the total content of the delafossite-type oxide and the inorganic porous material.

<Measurement of Average Particle Diameter>

With regard to the exhaust gas purification catalyst (sample) obtained in each of Examples and Comparative Examples, the average particle diameter (D50) of each of the delafossite-type oxide and the alumina was measured using a laser diffraction scattering-type particle size distribution, and the results were shown in Tables 1 and 2.

Each of the samples (powders) was introduced into an aqueous solvent by using an automatic sample supply machine for a laser diffraction particle size distribution measuring device ("Microtorac SDC", manufactured by Nikkiso Co., Ltd.), and the sample was irradiated with ultrasonic waves of 30 W at a flow rate of 50% for 360 seconds. Thereafter, the particle size distribution was measured by using a laser diffraction particle size distribution measuring device "MT3000II" manufactured by Nikkiso Co., LTD., and the D50 was then measured from the obtained volume-basis particle size distribution chart. In this case, it was determined under the conditions where the refractive index of the particle was 1.5, the particle shape was spherical, the refractive index of the solvent was 1.3, the zero-setting was 30 seconds, the measurement time was 30 seconds, and the average value was from two measurements.

<Exhaust Gas Purification Performance Test>

The catalytic activity was evaluated as follows after the exhaust gas purification catalyst (sample) obtained in each of Examples and Comparative Examples was aged. The durability condition was at 950° C. for 4 hours under an air atmosphere.

Using a catalyst evaluation device (SIGU-1000, manufactured by HORIBA, Ltd.), the exhaust gas purification catalyst (sample) was set in a reaction furnace thereof, and a model gas composed of CO: 1.4%, NO: 1,500 ppm, $C_3H_6$: 500 ppmC, $O_2$: 0.7%, and the residual of $N_2$ was circulated in the reaction furnace. Then, the outlet gas components were measured at 100 to 600° C. using an automobile exhaust gas measuring device (MEXA-7100, manufactured by HORIBA Ltd.). From the results of the light-off performance evaluation, the temperature (T50) (° C.) at which the model gas was purified to 50% and the purification rate ($\eta$400) (%) of the model gas at 400° C. were determined, and the results were shown in Tables 3 and 4.

TABLE 1

| No | Type of Delafossite | Ag in A Site (at. %) | Cu in (Delafossite + Inorganic Porous Material) (% by mass) | Ag in (Delafossite + Inorganic Porous Material) (% by mass) | Average Particle Diameter of Delafossite (D50/μm) | Inorganic Porous Material | Average Particle Diameter of Inorganic Porous Material (D50/μm) |
|---|---|---|---|---|---|---|---|
| Comparative Example 1 | $CuCrO_2$ | 0 | 5.2 | 0.00 | 3.2 | θ alumina | 12.4 |
| Comparative Example 2 | $Cu_{0.8}Ag_{0.2}CrO_2$ | 20 | 5.2 | 2.20 | 15.3 | θ alumina | 12.4 |
| Example 1 | $Cu_{0.99}Ag_{0.01}CrO_2$ | 1 | 5.2 | 0.09 | 11.1 | θ alumina | 12.4 |
| Example 2 | $Cu_{0.99}Ag_{0.01}MnO_2$ | 1 | 5.2 | 0.09 | 40.0 | θ alumina | 12.4 |
| Example 3 | $Cu_{0.98}Ag_{0.02}CrO_2$ | 2 | 5.2 | 0.18 | 12.0 | θ alumina | 12.4 |
| Example 4 | $Cu_{0.94}Ag_{0.06}CrO_2$ | 6 | 5.2 | 0.56 | 12.7 | θ alumina | 12.4 |
| Example 5 | $Cu_{0.9}Ag_{0.1}CrO_2$ | 10 | 5.2 | 0.98 | 9.3 | θ alumina | 12.4 |

TABLE 2

| No | Type of Delafossite | Ag in A Site (at. %) | Cu in (Delafossite + Inorganic Porous Material) (% by mass) | Ag in (Delafossite + Inorganic Porous Material) (% by mass) | Average Particle Diameter of Delafossite (D50/μm) | Inorganic Porous Material | Average Particle Diameter of Inorganic Porous Material (D50/μm) |
|---|---|---|---|---|---|---|---|
| Example 1 | $Cu_{0.99}Ag_{0.01}CrO_2$ | 1 | 5.2 | 0.09 | 11.1 | θ alumina | 12.4 |
| Example 2 | $Cu_{0.99}Ag_{0.01}MnO_2$ | 1 | 5.2 | 0.09 | 40.0 | θ alumina | 12.4 |
| Example 6 | $Cu_{0.99}Ag_{0.01}Al_{0.8}Mn_{0.2}O_2$ | 1 | 5.2 | 0.09 | 45.1 | θ alumina | 12.4 |
| Example 7 | $Cu_{0.99}Ag_{0.01}Cr_{0.8}Mn_{0.2}O_2$ | 1 | 5.2 | 0.09 | 4.5 | θ alumina | 12.4 |
| Example 8 | $Cu_{0.99}Ag_{0.01}Cr_{0.5}Mn_{0.5}O_2$ | 1 | 5.2 | 0.09 | 21.7 | θ alumina | 12.4 |
| Example 9 | $Cu_{0.99}Ag_{0.01}Cr_{0.2}Mn_{0.8}O_2$ | 1 | 5.2 | 0.09 | 26.3 | θ alumina | 12.4 |

TABLE 3

| No. | Type of Delafossite | T50 (°C) CO | T50 (°C) HC | T50 (°C) NO | η400 (%) CO | η400 (%) HC | η400 (%) NO |
|---|---|---|---|---|---|---|---|
| Comparative Example 1 | $CuCrO_2$ | 290 | 412 | 410 | 66 | 46 | 37 |
| Comparative Example 2 | $Cu_{0.8}Ag_{0.2}CrO_2$ | 269 | 449 | 422 | 69 | 39 | 25 |
| Example 1 | $Cu_{0.99}Ag_{0.01}CrO_2$ | 252 | 423 | 398 | 78 | 44 | 51 |
| Example 2 | $Cu_{0.99}Ag_{0.01}MnO_2$ | 247 | 436 | 390 | 83 | 44 | 62 |
| Example 3 | $Cu_{0.98}Ag_{0.02}CrO_2$ | 253 | 436 | 407 | 76 | 40 | 43 |
| Example 4 | $Cu_{0.94}Ag_{0.06}CrO_2$ | 260 | 458 | 410 | 71 | 44 | 40 |
| Example 5 | $Cu_{0.9}Ag_{0.1}CrO_2$ | 265 | 455 | 418 | 70 | 42 | 34 |

TABLE 4

| No. | Type of Delafossite | T50 (°C) CO | T50 (°C) HC | T50 (°C) NO | η400 (%) CO | η400 (%) HC | η400 (%) NO |
|---|---|---|---|---|---|---|---|
| Example 1 | $Cu_{0.99}Ag_{0.01}CrO_2$ | 252 | 423 | 398 | 78 | 44 | 51 |
| Example 2 | $Cu_{0.99}Ag_{0.01}MnO_2$ | 247 | 436 | 390 | 83 | 44 | 62 |
| Example 6 | $Cu_{0.99}Ag_{0.01}Al_{0.8}Mn_{0.2}O_2$ | 239 | 406 | 379 | 91 | 48 | 76 |
| Example 7 | $Cu_{0.99}Ag_{0.01}Cr_{0.8}Mn_{0.2}O_2$ | 243 | 408 | 377 | 88 | 48 | 73 |
| Example 8 | $Cu_{0.99}Ag_{0.01}Cr_{0.5}Mn_{0.5}O_2$ | 239 | 396 | 371 | 88 | 50 | 75 |
| Example 9 | $Cu_{0.99}Ag_{0.01}Cr_{0.2}Mn_{0.8}O_2$ | 238 | 393 | 373 | 88 | 50 | 76 |

From the results shown in Tables 1 and 3, it was confirmed that when the content of Ag in the A site was 0.001 at. % or more and less than 20 at. %, the three-way catalyst performance including $NO_X$ purification performance was improved. Especially, it was found that when the content of Ag in the A site was preferably 0.001 at. % or more or 10 at. % or less, more preferably 0.1 at. % or more or 5 at. % or less, even more preferably 1 at. % or more or 5 at. % or less, the purification performance was suitably exhibited.

Also, from the results shown in Tables 2 and 4, it was confirmed that when the atomic ratio of the content of Mn in the B site to the total content of Al, Cr, and Ga (Al+Cr+Ga) in the B site was Mn:Al+Cr+Ga=10:90 to 90:10, the three-way catalyst performance was improved. Among others, it was found that the atomic ratio was more preferably 30:70 to 90:10, even more preferably 40:60 to 90:10. Especially, from the viewpoint of improving the stable purification performance of HC and NO, it was found that the atomic ratio was still more preferably 50:50 to 90:10, furthermore preferably 50:50 to 80:20.

The invention claimed is:

1. A delafossite-type oxide for an exhaust gas purification catalyst, represented by a general formula $ABO_2$,
wherein Cu and Ag are comprised in the A site of the general formula, only Mn is comprised in the B site of the general formula, or Mn and one or more elements selected from the group consisting of Al, Cr, and Ga are comprised in the B site of the general formula, and Ag is comprised at a ratio of 0.001 at. % or more and less than 20 at. % in the A site of the general formula.

2. An exhaust gas purification catalyst, comprising the delafossite-type oxide according to claim 1 and an inorganic porous material.

3. An exhaust gas purification catalyst, having a configuration in which the exhaust gas purification catalyst according to claim 2 is supported on a substrate made of metal or ceramics.

4. A delafossite-type oxide for an exhaust gas purification catalyst, represented by a general formula $ABO_2$,
wherein Cu and Ag are comprised in the A site of the general formula, Mn and one or more elements selected from the group consisting of Al, Cr, and Ga are comprised in the B site of general formula, Ag is comprised at a ratio of 0.001 at. % or more and less than 20 at. % in the A site of the general formula, and the atomic ratio of the content of Mn to the total content of Al, Cr, and Ga in the B site of the general formula is 10:90 to 90:10.

5. The delafossite-type oxide according to claim 4, wherein the atomic ratio of the content of Mn to the total content of Al, Cr, and Ga in the B site of the general formula is 50:50 to 80:20.

6. An exhaust gas purification catalyst, comprising the delafossite-type oxide according to claim 4 and an inorganic porous material.

7. An exhaust gas purification catalyst, having a configuration in which the exhaust gas purification catalyst according to claim 6 is supported on a substrate made of metal or ceramics.

* * * * *